(12) United States Patent
Rodriguez Jimenez et al.

(10) Patent No.: US 10,612,521 B2
(45) Date of Patent: Apr. 7, 2020

(54) WIND TURBINE SHADOW FLICKER MANAGEMENT SYSTEM

(71) Applicant: General Electric Company, Schenectady, NY (US)

(72) Inventors: Grecia Sofia Rodriguez Jimenez, Torreon (MX); Hammad Ahmad, Laurens, SC (US); Sebastien David Bertrand, Greer, SC (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 15/911,286

(22) Filed: Mar. 5, 2018

(65) Prior Publication Data
US 2019/0271296 A1 Sep. 5, 2019

(51) Int. Cl.
| | | |
|---|---|---|
| *G06F 19/00* | (2018.01) | |
| *F03D 7/04* | (2006.01) | |
| *F03D 7/02* | (2006.01) | |
| *G05B 19/042* | (2006.01) | |
| *F03D 17/00* | (2016.01) | |
| *G01W 1/10* | (2006.01) | |
| *F03D 9/25* | (2016.01) | |

(52) U.S. Cl.
CPC .......... *F03D 7/048* (2013.01); *F03D 7/0204* (2013.01); *F03D 7/0224* (2013.01); *F03D 7/0264* (2013.01); *F03D 17/00* (2016.05); *G05B 19/042* (2013.01); *F03D 9/257* (2017.02); *G01W 1/10* (2013.01); *G05B 2219/2619* (2013.01)

(58) Field of Classification Search
CPC ... F03D 7/00; G01J 1/42; G01J 1/0403; G01J 1/0407
See application file for complete search history.

(56) References Cited

U.S. PATENT DOCUMENTS

| | | | | |
|---|---|---|---|---|
| 8,353,667 | B2 * | 1/2013 | Hoffmann | F03D 7/0204 416/37 |
| 9,261,075 | B2 * | 2/2016 | Li | F03D 80/20 |
| 2006/0267347 | A1 | 11/2006 | Wobben | |
| 2011/0104629 | A1 * | 5/2011 | Navarro | A61C 7/04 433/4 |
| 2011/0204629 | A1 * | 8/2011 | Sorensen | F03D 7/0264 290/44 |
| 2015/0115610 | A1 * | 4/2015 | Quinlan | F03D 7/0296 290/44 |
| 2015/0308406 | A1 * | 10/2015 | Li | F03D 80/20 290/44 |

(Continued)

*Primary Examiner* — Kidest Bahta
(74) *Attorney, Agent, or Firm* — Dority & Manning, P.A.

(57) ABSTRACT

A system and method for managing shadow flicker at a wind turbine site having at least one wind turbine includes determining, via a processor, a sun position of the wind turbine site. The method also includes receiving, via the processor, a spatial location of the at least one wind turbine with respect to at least one receptor. Further, the method includes determining, via the processor, whether shadow flicker is occurring at the at least one receptor based, at least in part, on the sun position and the spatial location of the at least one wind turbine. Moreover, the method includes implementing, via the processor, a corrective action for the at least one wind turbine when shadow flicker occurs at the at least one receptor to reduce the shadow flicker.

16 Claims, 6 Drawing Sheets

(56) References Cited

U.S. PATENT DOCUMENTS

2016/0032897 A1\* 2/2016 Hawkins ................. F03D 17/00
                                                    342/418
2017/0248121 A1\* 8/2017 Baba ......................... F03D 9/25
2019/0003455 A1\* 1/2019 Leyte-Vidal .......... G01S 15/885

\* cited by examiner

WIND TURBINE SHADOW FLICKER MANAGEMENT SYSTEM

FIELD

The subject matter described herein relates generally to wind turbines, and more particularly, to systems and methods for managing shadow flicker of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor coupled to the gearbox and to the generator. The rotor includes a rotatable hub having a plurality of rotor blades mounted thereto. The rotor and the gearbox are mounted on a bedplate member support frame located within the nacelle. More specifically, in many wind turbines, the gearbox is mounted to the bedplate member via one or more torque supports or arms. The rotor blades can be individually rotated or pitched about their respective pitch axes and the nacelle may be rotated about its yaw axis such that the rotor faces into the wind, thereby capturing more energy. As such, the rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Wind turbines may be placed individually or in groups, also known as wind farms, in on- or off-shore environments. When the wind turbine is placed in the proximity of a residential area, it is possible when the sun is in unfavorable positions, that the wind turbine or rotor thereof is between the sun and a residence of the residential area. If the sunshine is not affected by dark clouds, the rotating rotor constantly throws a shadow onto the residence or property thereof. The shadow casting, also known as shadow flicker, caused by a wind turbine on the adjoining properties is often perceived by the residents as being very troublesome and may spook animals, such as animals grazing in the proximity of a wind turbine.

Several factors, such as the position and point of the sun and cloudiness, may influence the shadow flicker behavior of wind turbines. In the northern hemisphere, the risk for shadow flickering is largest in spring, autumn and winter as well as sunrise and sunset. Therefore, even if the wind turbine satisfies the legal approval requirements, there is no guarantee that the undesired shadow casting effect is prevented.

The effect of shadow flicker may be resolved via wind turbine shut-down systems that use a plurality of light sensitive sensors typically positioned in different locations to determine the shadow casting behavior of a wind turbine. More specifically, the light sensors are used to determine light intensity at different regions, i.e., in a shadowed region and in a light region with direct light incidence (direct sun irradiation). Such shut-down systems often have a complex set-up and wiring and each light sensitive sensor is prone to failure. Accordingly, if one of the light sensors fails, the shut-down system fails, thereby causing the shut-down systems to be unreliable.

In view of the foregoing, a system and method for managing wind turbine shadow flicker that addresses the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for managing shadow flicker at a wind turbine site having at least one wind turbine. The method includes determining, via a processor, a sun position of the wind turbine site. The method also includes receiving, via the processor, a spatial location of the at least one wind turbine with respect to at least one receptor. Further, the method includes determining, via the processor, whether shadow flicker is occurring at the at least one receptor based, at least in part, on the sun position and the spatial location of the at least one wind turbine. Moreover, the method includes implementing, via the processor, a corrective action for the at least one wind turbine when shadow flicker occurs at the at least one receptor to reduce the shadow flicker.

In one embodiment, the sun position may include information regarding the azimuth angle of the sun and/or an altitude of the sun. In another embodiment, the spatial location of the wind turbine(s) with respect to the receptor(s) may include, for example, a height of a tower of the wind turbine(s), a rotor diameter of the wind turbine(s) and/or a distance between the wind turbine(s) and the receptor(s).

In further embodiments, the step of determining whether shadow flicker is occurring at the at the at least one receptor based, at least in part, on the sun position and the spatial location of the wind turbine(s) may include determining whether the distance between the wind turbine and the receptor(s) is within a shadow range of the at least one receptor based on at least one of time of day or time of year and determining whether shadows are in a direction of the at least one receptor based on the spatial location of the at least one wind turbine.

In additional embodiments, the method may include receiving a yaw angle of the at least one wind turbine, comparing the yaw angle to a predetermined angle range, and if the yaw angle is within the predetermined angle range, determining, via the processor, whether shadow flicker is occurring at the at least one receptor based, at least in part, on the sun position and the spatial location of the at least one wind turbine.

In several embodiments, the method may further include determining a light intensity in at least one location at the wind turbine site via at least one sensor and determining whether shadow flicker is occurring at the at least one receptor based, at least in part, on the sun position, the spatial location of the at least one wind turbine, and the light intensity.

In particular embodiments, the method may also include receiving information regarding weather forecast data and determining whether shadow flicker is occurring at the at least one receptor based, at least in part, on the sun position, the spatial location of the at least one wind turbine, and the weather forecast data. More specifically, in such embodiments, the weather forecast data may include any of the following weather conditions: temperature, cloud coverage, air density, air pressure, precipitation, wind conditions, and/or humidity.

In another embodiment, the step of implementing the corrective action at the wind turbine site may further include shutting down the wind turbine(s), de-rating the wind turbine(s), pitching one or more rotor blades of the wind turbine(s), and/or yawing a nacelle of the wind turbine(s).

In certain embodiments, the wind turbine site may include a wind farm having a plurality of wind turbines. In such embodiments, the step of implementing the corrective action at the wind turbine site may include sending, via farm-level controller, a control signal to one or more turbine-level controllers of the plurality of wind turbines. Thus, the control signal instructs one or more of the plurality of wind turbines to shut down, pitch one or more rotor blades, de-rate one or more of the plurality of wind turbine, or yaw a nacelle of one or more of the plurality of wind turbines.

In further embodiments, the method may include tracking and storing at least one of the control signals sent by the farm-level controller or a number of times shadow flicker occurs at the wind turbine site. In additional embodiments, the processor and/or the farm-level or turbine-level controllers may be online and thus may have cloud connectivity.

In another aspect, the present disclosure is directed to a system for managing shadow flicker at a wind farm having a plurality of wind turbines. The system includes a plurality of turbine-level controllers and a farm-level controller communicatively coupled to the plurality of turbine-level controllers. As such, each of the plurality of wind turbines is controlled by one of the plurality of turbine-level controllers. The farm-level controller is configured to perform one or more operations, including but not limited to receiving a sun position of the wind farm, receiving a spatial location of one or more of the plurality of wind turbines with respect to at least one receptor, determining whether shadow flicker is occurring at the receptor(s) based, at least in part, on the sun position and the spatial location of the one or more of the plurality of wind turbines, sending a control signal to one or more of the plurality of turbine-level controllers instructing one or more of the plurality of turbine-level controllers to implement a corrective action to reduce the shadow flicker. It should be understood that the system may further include any of the additional features as described herein.

In yet another aspect, the present disclosure is directed to a method for determining whether a wind farm is generating shadow flicker. The wind farm has a plurality of wind turbines. The method includes determining a distance between each of the plurality of wind turbines and at least one receptor. The method also includes determining whether the distances are within a shadow range of the receptor(s) based on time of day and time of year. If the distances are within the shadow range, the method includes determining whether shadows generated by one or more of the plurality of wind turbines are facing the receptor(s) based on a spatial location of the one or more of the plurality of wind turbines. If the shadows are facing the receptor(s), the method includes determining whether shadow flicker is occurring at the receptor(s) based on the shadows and a measured light intensity at the one or more of the plurality of wind turbines, a yaw angle of the one or more of the plurality of wind turbines, and/or weather forecast data. It should be understood that the method may further include any of the additional steps and/or features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
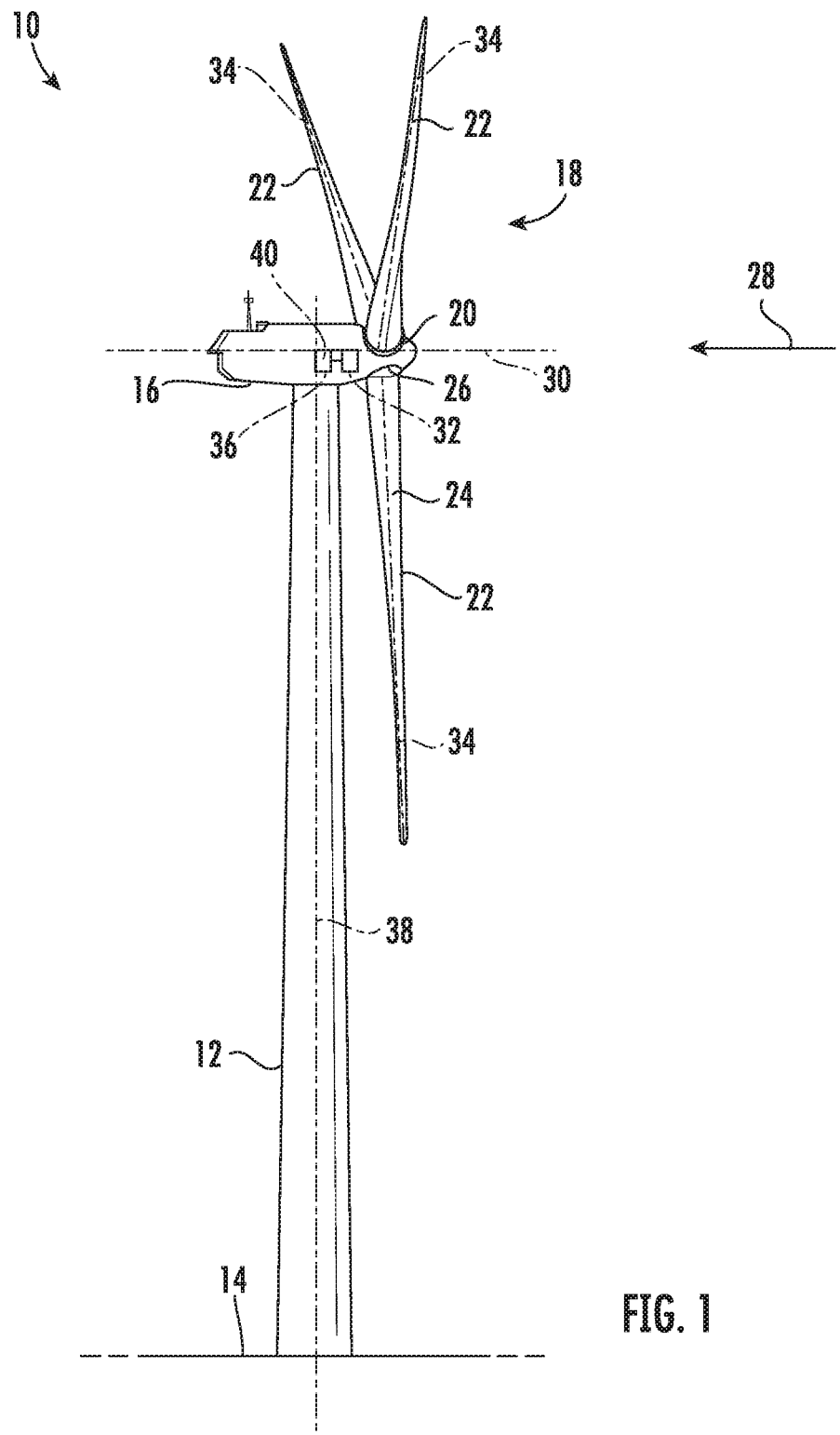
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 is a horizontal-axis wind turbine. Alternatively, the wind turbine 10 may be a vertical-axis wind turbine. Further, as shown, the wind turbine 10 includes a tower 12 that extends from a support system 14, a nacelle 16 mounted on the tower 12, and a rotor 18 that is coupled to the nacelle 16. The rotor 18 includes a rotatable hub 20 and at least one rotor blade 22 coupled to and extending outward from the hub 20. As shown in the illustrated embodiment, the rotor 18 includes three rotor blades 22. In an alternative embodiment, the rotor 18 may include more or less than three rotor blades 22. As such, the rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26.

Moreover, a pitch angle or blade pitch of the rotor blades 22, i.e., an angle that determines a perspective of the rotor blades 22 with respect to direction 28 of the wind, may be changed by a pitch adjustment system 32 to control the load and power generated by wind turbine 10 by adjusting an angular position of at least one of the rotor blades 22 relative to wind vectors. For example, as shown, the pitch adjustment system 32 is configured to rotate each of the rotor blades about their respective pitch axes 34. In addition, the blade pitch of each rotor blade 22 may be controlled individually by a control system 36. Alternatively, the blade pitch for each rotor blade 22 may be controlled simultaneously by the control system 36. Further, in one embodiment, as the wind direction 28 changes, a yaw direction of the nacelle 16 may be controlled about a yaw axis 38 to position the rotor blades 22 with respect to the incoming wind direction 28.

As shown in the illustrated embodiment, the control system 36 is shown as being centralized within the nacelle 16, however, the control system 36 may be a distributed system throughout the wind turbine 10, on the support system 14, within a wind farm, and/or at a remote-control center. Further, the control system 36 includes a processor 40 configured to perform the methods and/or steps described herein. Further, many of the other components described herein may include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in one embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
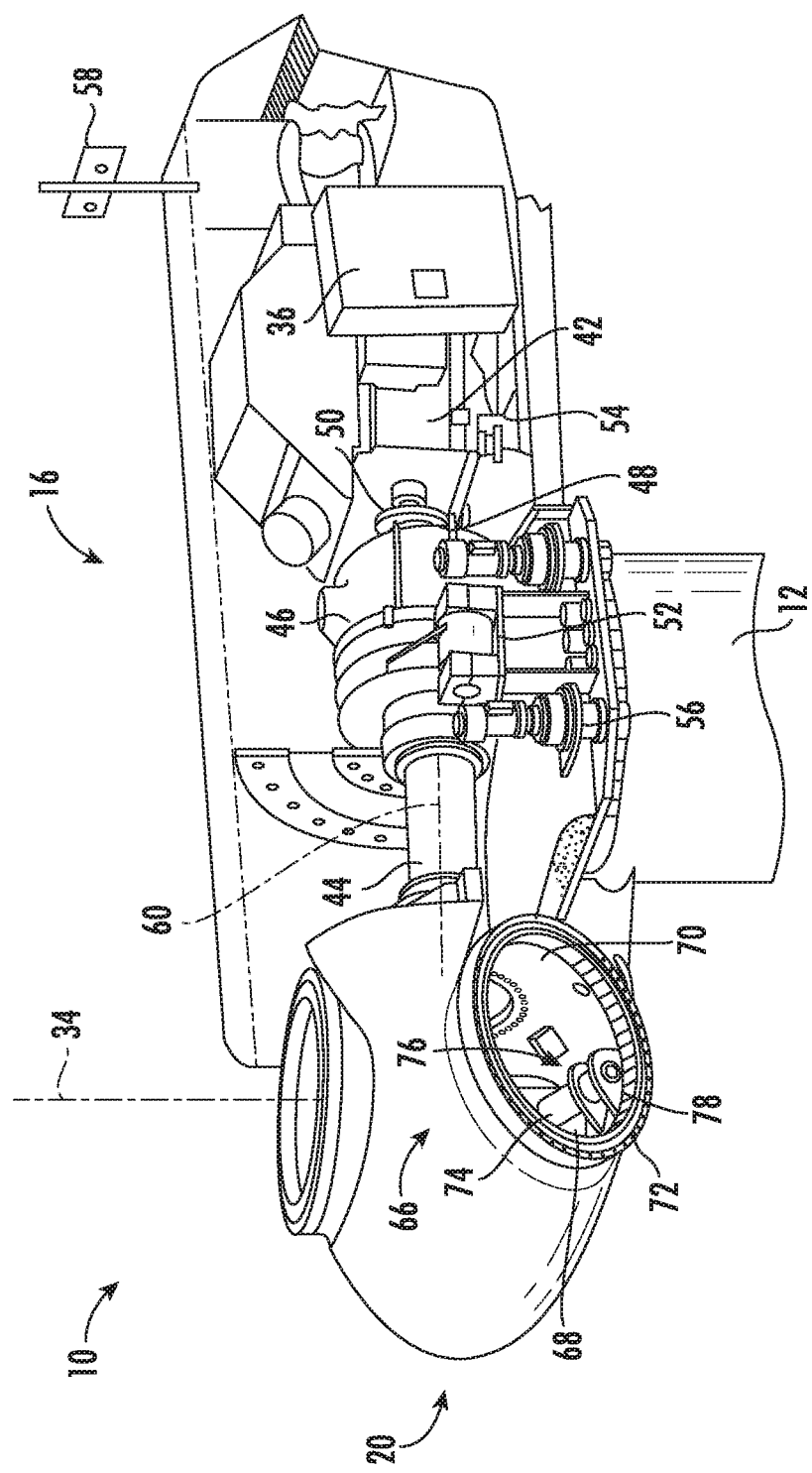
FIG. 2 illustrates a detailed, internal view of one embodiment of a nacelle of a wind turbine according to the present disclosure.

Referring now to FIG. 2, a detailed, internal view of the nacelle 16 of the wind turbine 10 is illustrated. As shown, the hub 20 is rotatably coupled to an electric generator 42 positioned within the nacelle 16 by a rotor shaft 44 (sometimes referred to as either a main shaft or a low speed shaft), a gearbox 46, a high-speed shaft 48, and a coupling 50. The rotor shaft 44 is disposed coaxial to longitudinal axis 60 of the nacelle 16. As such, rotation of the rotor shaft 44 rotatably drives the gearbox 46 that subsequently drives the high-speed shaft 48. The high-speed shaft 48 rotatably drives the generator 42 with the coupling 50 and rotation of the high-speed shaft 48 facilitates production of electrical power by the generator 42. The gearbox 46 and the generator 42 are supported by supports 52, 54. In addition, the gearbox 46 utilizes a dual path geometry to drive the high-speed shaft 48. Alternatively, the rotor shaft 44 is coupled directly to the generator 42 with the coupling 50.

The wind turbine 10 may also include a yaw drive mechanism 56 that may be used to rotate the nacelle 16 and the hub 20 on the yaw axis 38 (FIG. 1) to control the perspective of the rotor blades 22 with respect to the wind direction 28. The nacelle 16 may also include at least one meteorological mast 58 that includes a wind vane and anemometer. Thus, the mast 58 provides information to the control system 36 that may include wind direction and/or wind speed.

Referring still to FIG. 2, the hub 20 also includes a pitch assembly 66 having one or more pitch drive systems 68 and at least one sensor 70. Each pitch drive system 68 is coupled to a respective rotor blade 22 for modulating the blade pitch of the associated rotor blade 22 along its pitch axis 34. Further, as shown, the pitch assembly 66 includes at least one pitch bearing 72 coupled to the hub 20 and to the respective rotor blade 22 for rotating the rotor blade 22 about the pitch axis 34. The pitch drive system 68 also includes a pitch drive motor 74, pitch drive gearbox 76, and pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to the pitch drive pinion 78 such that rotation of the pitch drive pinion 78 causes rotation of the pitch bearing 72. More specifically, as shown, the pitch drive pinion 78 is coupled to the pitch bearing 72 such that rotation of the pitch drive gearbox 76 rotates the pitch bearing 72 and the rotor blade 22 about the pitch axis 34 to change the blade pitch of the rotor blade 22. The pitch drive system 68 may also be coupled to the control system 36 for adjusting the blade pitch of the rotor blades 22 upon receipt of one or more signals from the control system 36.

Figure 3:
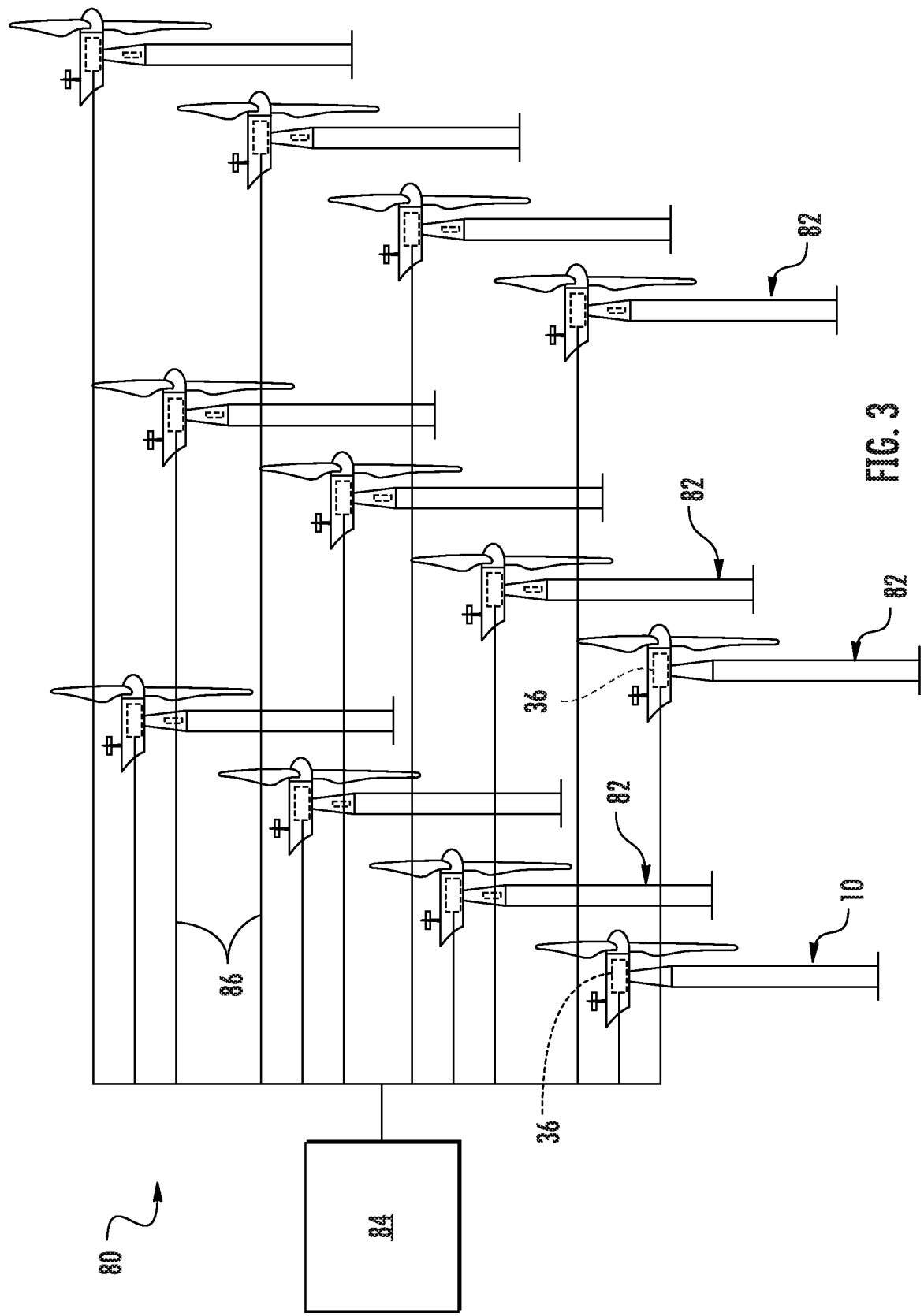
FIG. 3 illustrates a schematic view of one embodiment of a wind farm according to the present disclosure.

Referring now to FIG. 3, the wind turbine 10 described herein may be part of a wind farm 80 that is controlled according to the system and method of the present disclosure is illustrated. As shown, the wind farm 80 may include a plurality of wind turbines 82, including the wind turbine 10 described above, and a farm-level controller 84. For example, as shown in the illustrated embodiment, the wind farm 80 includes twelve wind turbines, including wind turbine 10. However, in other embodiments, the wind farm 80 may include any other number of wind turbines, such as less than twelve wind turbines or greater than twelve wind turbines. In one embodiment, the control system 36 of the wind turbine 10 may be communicatively coupled to the farm-level controller 84 through a wired connection, such as by connecting the control system 36 through suitable communicative links 86 or networks (e.g., a suitable cable). Alternatively, the control system 36 may be communicatively coupled to the farm-level controller 84 through a wireless connection, such as by using any suitable wireless communications protocol known in the art. In addition, the farm-level controller 84 may be generally configured similar to the control systems 36 for each of the individual wind turbines 82 within the wind farm 80.

Figure 4:
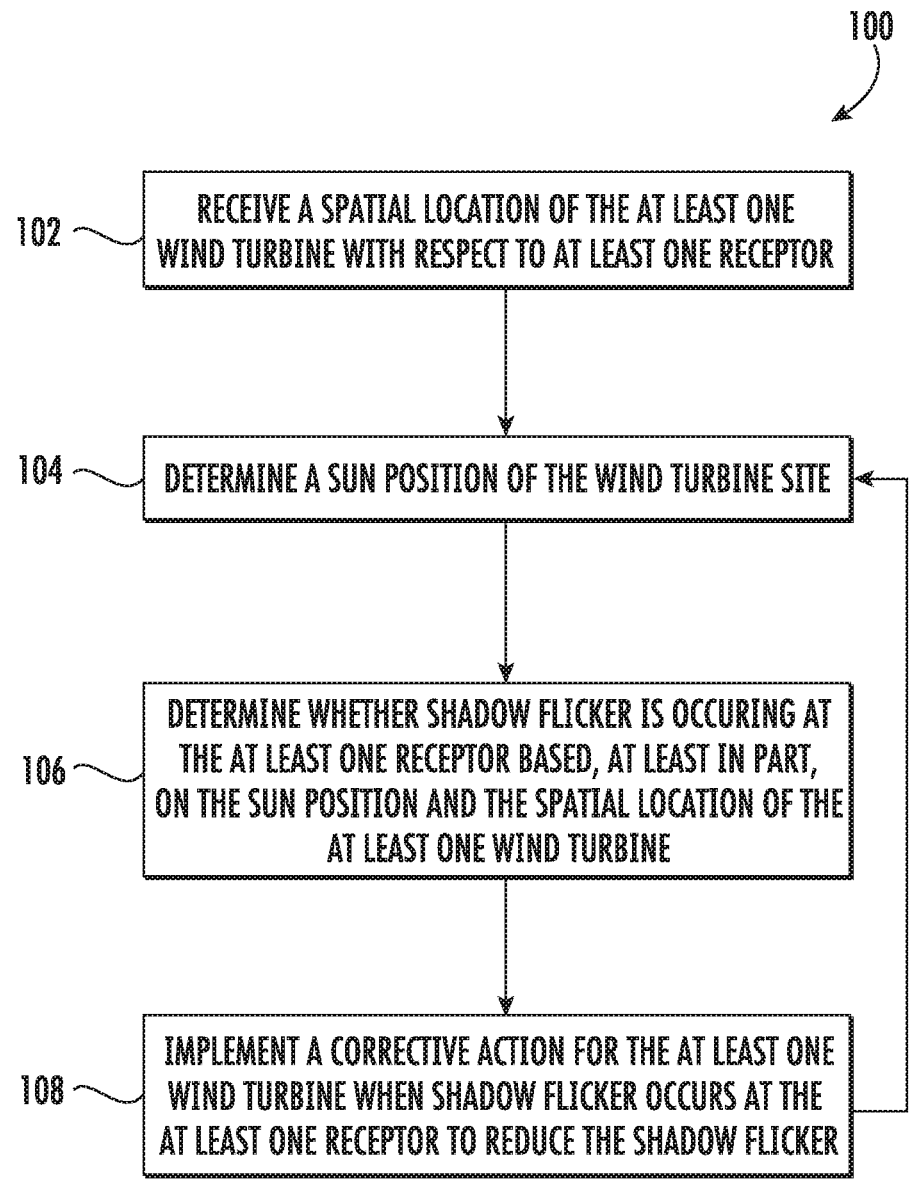
FIG. 4 illustrates a flow diagram of one embodiment of a method for managing shadow flicker of a wind turbine at a wind turbine site according to the present disclosure.
Figure 5:
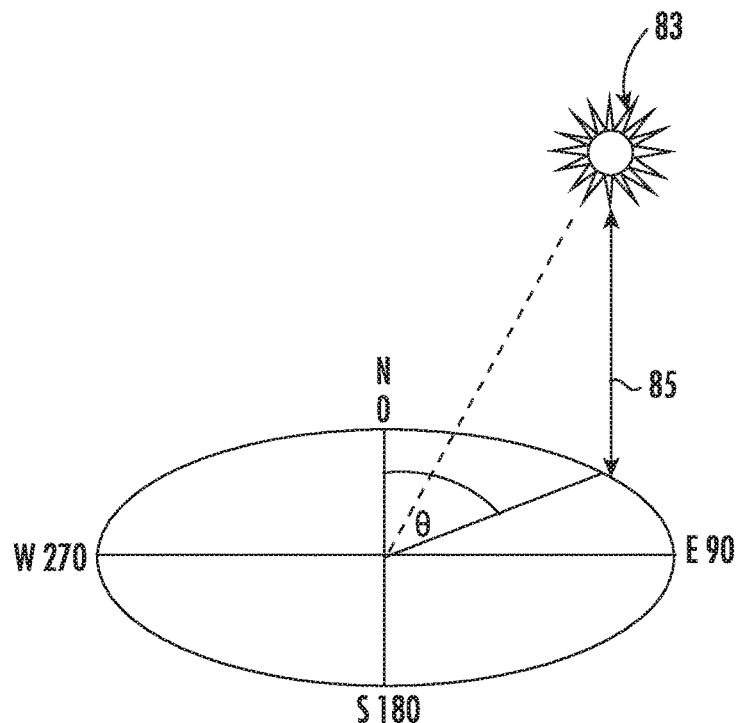
FIG. 5 illustrates a schematic diagram of one embodiment of the sun position according to the present disclosure.
Figure 6:
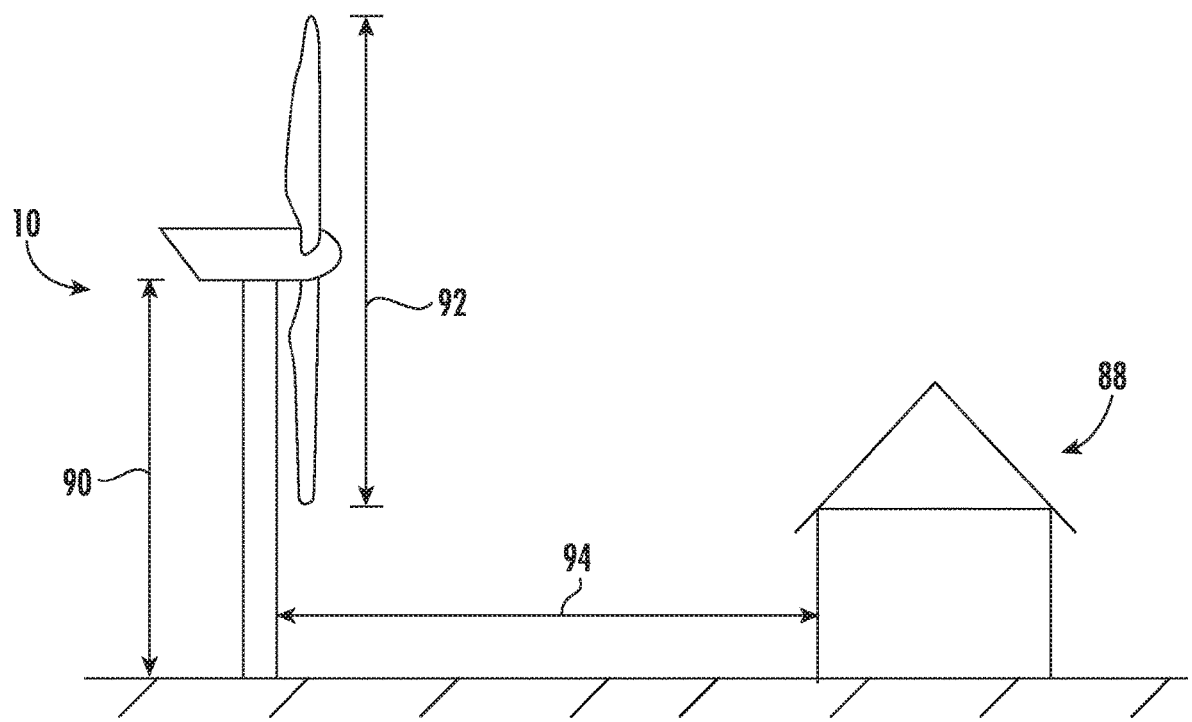
FIG. 6 illustrates a schematic view of one embodiment of the spatial relationship of a wind turbine and a receptor according to the present disclosure; and, FIG. 7 illustrates a flow diagram of another embodiment of a method for managing shadow flicker of a wind turbine at a wind turbine site according to the present disclosure.
Figure 7:
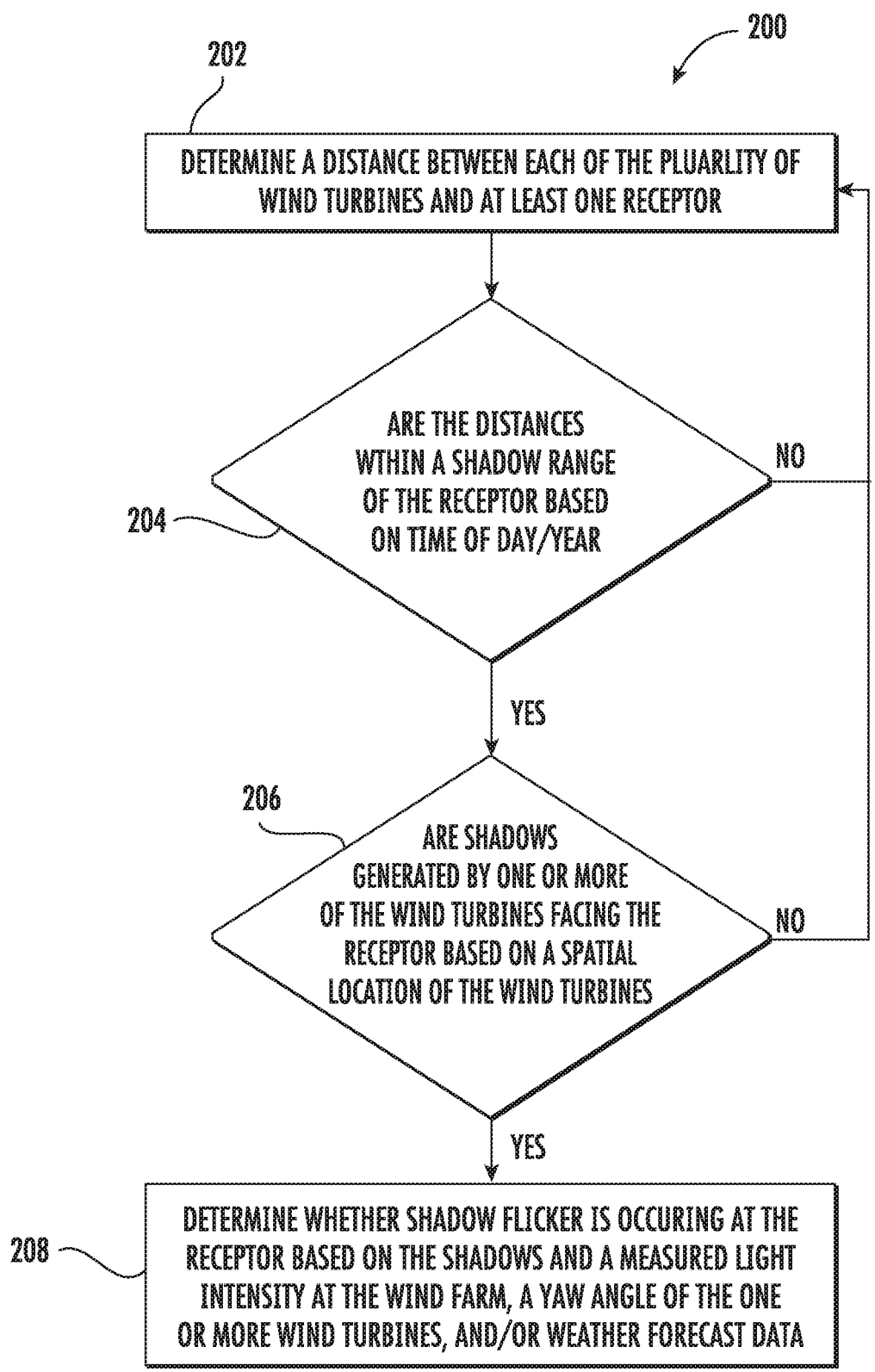

Referring now to FIG. 4, a flow diagram of one embodiment of a method 100 for managing shadow flicker of a wind turbine at a wind turbine site, such as the wind turbine 10 at the wind farm 80 of FIG. 3, is illustrated. As shown at 102, the method 100 includes receiving a spatial location of the wind turbine 10 with respect to at least one receptor. For example, as shown in FIG. 6, the spatial location of the wind turbine 10 with respect to the receptor 88 may include, for example, a height 90 of the tower 12 of the wind turbine 10, a rotor diameter 92 of the wind turbine 10, and/or a distance 94 between the wind turbine 10 and the receptor 88. As shown at 104, the method 100 includes determining a sun position at the wind turbine site. For example, as shown in FIG. 5, the sun position may include information regarding the azimuth angle θ of the sun 83 and/or an altitude 85 of the sun 83.

Referring still to FIG. 4, as shown at 106, the method 100 includes determining whether shadow flicker is occurring at the receptor 88 based, at least in part, on the sun position and the spatial location of the wind turbine 10. For example, in one embodiment, the farm-level controller 84 may determine whether the distance 94 between the wind turbine 10 and the receptor 88 is within a shadow range of the receptor 88 based on the time of day or year and if so, the farm-level controller 84 will determine whether shadows of the wind turbine 10 are cast in the direction of the receptor 88 based on the spatial location of the wind turbine 10.

In additional embodiments, the farm-level controller 84 may also utilize one or more additional parameters in determining the presence of shadow flicker for added robustness. For example, in one embodiment, the farm-level controller 84 may receive a yaw angle of the wind turbine 10 and compare the yaw angle to a predetermined angle range. If the yaw angle is within the predetermined angle range, the farm-level controller 84 then determines whether shadow flicker is occurring at the receptor 88. By knowing the yaw angle, the farm-level controller 84 can more accurately determined whether shadow is being cast over the receptor 88 as if the wind turbine 10 is not facing the receptor 88 within certain angles, shadow flickering might not be occurring.

In another embodiment, in addition to the yaw angle, the farm-level controller 84 may receive a light intensity from at least one location at the wind farm 80 as measured via at least one sensor. In such embodiments, the method 100 may include determining whether shadow flicker is occurring at the receptor 88 based, at least in part, on the sun position, the spatial location of the wind turbine 10, and the light intensity.

In still further embodiments, the farm-level controller 84 may receive information regarding weather forecast data and determine whether shadow flicker is occurring at the receptor 88 based, at least in part, on the sun position, the spatial location of the wind turbine 10, and the weather forecast data. More specifically, in such embodiments, the weather forecast data may include any of the following weather conditions: temperature, cloud coverage, air density, air pressure, precipitation, wind conditions, and/or humidity.

Referring back to FIG. 4, as shown at 108, the method 100 includes implementing a corrective action for the wind turbine 10 when shadow flicker occurs at the receptor 88 to reduce the shadow flicker. More specifically, the correction action may include shutting down the wind turbine 10, de-rating the wind turbine 10, pitching one or more rotor blades 22 of the wind turbine 10, and/or yawing the nacelle 16 of the wind turbine 10 (i.e. changing the yaw angle). For example, in one embodiment, the farm-level controller 84 may send a control signal to one or more turbine-level controllers 36 of the plurality of wind turbines 92. Thus, the control signal instructs one or more of the plurality of wind turbines 92 to shut down, pitch one or more of their respective rotor blades 22, de-rate (e.g. by reducing the generator speed thereof), or yaw away from the receptor 88.

In further embodiments, the farm-level controller 84 may track and/or store the control signals and/or a number of times shadow flicker occurs at the wind farm 80. For example, in one embodiment, the farm-level or turbine-level controllers may be online and thus may have cloud connectivity. Thus, keeping tracking of the control signals and of shadow in general in a remote manner is possible.

Referring now to FIG. 5, a flow diagram of another embodiment of a method 200 for determining whether the wind farm 80 is generating shadow flicker is illustrated. As shown at 202, the method 200 includes determining a distance between each of the plurality of wind turbines 92 and at least one receptor 88. As shown at 204, the method 200 includes determining whether the distances are within a shadow range of the receptor 88 based on time of day and time of year. If the distances are within the shadow range, as shown at 206, the method 200 includes determining whether shadows generated by one or more of the plurality of wind turbines 92 are facing the receptor 88 based on a spatial location of the one or more of the plurality of wind turbines 92. If the shadows are facing the receptor 88, as shown at 208, the method 200 includes determining whether shadow flicker is occurring at the receptor 88 based on the shadows and a measured light intensity at the one or more of the plurality of wind turbines 92, a yaw angle of the one or more of the plurality of wind turbines 92, and/or weather forecast data.

The shadow flicker may be continuously determined after the wind turbine 10 has been shut down. As such, the wind turbine 10 may re-start automatically if the shadow flicker remains below the predetermined shut-down level for a duration of time, or if the shadow has moved (e.g. by a change in the position of the sun or because of the path of movement of the sun) to such an extent that the receptor is no longer suffering from adverse effects due to a shadow being cast.

According to embodiments herein, the system of the present disclosure may exit from normal operation during the night or the system may only be put into operation during sunrise and/or sunset periods. Further, the system may be turned off during certain specific seasons (e.g. the summer) or during certain specific months of the year. All these operational states may be achieved with control software.

Exemplary embodiments of systems and methods for preventing the shadow flicker effect of wind turbines are described above in detail. The systems and methods are not limited to the specific embodiments described herein, but rather, components of the systems and/or steps of the methods may be utilized independently and separately from other components and/or steps described herein. For example, the light intensity detection system is not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for managing shadow flicker at a wind farm having a plurality of wind turbines, the method comprising:
   determining, via a processor of a farm-level controller, a sun position of the wind farm;
   receiving, via the processor, a spatial location of each of the plurality of wind turbines with respect to at least one receptor;
   receiving, via the processor, a yaw angle from each of the plurality of wind turbines;
   comparing each of the yaw angles to a predetermined angle range;
   if one or more of the yaw angles is within the predetermined angle range, determining, via the processor, whether shadow flicker is occurring at the at least one receptor based, at least in part, on the sun position and the spatial locations of each of the plurality of wind turbines; and,
   implementing, via the processor, a corrective action for each of the plurality of wind turbines when shadow flicker occurs at the at least one receptor to reduce the shadow flicker.

2. The method of claim 1, wherein the sun position comprises at least one of an azimuth angle of the sun or an altitude of the sun.

3. The method of claim 1, wherein the spatial location of each of the plurality of wind turbines with respect to at least one receptor further comprises at least one of a height of a tower of each of the plurality of wind turbines, a rotor diameter of each of the plurality of wind turbines, or a distance between each of the plurality of wind turbines and the at least one receptor.

4. The method of claim 3, wherein determining whether shadow flicker is occurring at the at the at least one receptor based, at least in part, on the sun position and the spatial location of each of the plurality of wind turbines further comprises:
   determining whether the distance between each of the plurality of wind turbines and the at least one receptor is within a shadow range of the at least one receptor based on at least one of time of day or time of year; and,
   determining whether shadows are in a direction of the at least one receptor based on the spatial location of each of the plurality of wind turbines.

5. The method of claim 1, further comprising determining a light intensity in at least one location at the wind farm via at least one sensor and determining whether shadow flicker is occurring at the at least one receptor based, at least in part, on the sun position, the spatial location of each of the plurality of wind turbines, and the light intensity.

6. The method of claim 1, further comprising receiving information regarding weather forecast data and determining whether shadow flicker is occurring at the at least one receptor based, at least in part, on the sun position, the spatial location of each of the plurality of wind turbines, and the weather forecast data.

7. The method of claim 6, wherein the weather forecast data comprises at least one of temperature, cloud coverage, air density, air pressure, precipitation, wind conditions, or humidity.

8. The method of claim 1, wherein implementing the corrective action at the wind farm further comprises at least one of shutting down one or more of the plurality of wind turbines, de-rating one or more of the plurality of wind turbines, pitching one or more rotor blades of one or more of the plurality of wind turbines, or yawing a nacelle of one or more of the plurality of wind turbines.

9. The method of claim 1, wherein the processor is online and comprises cloud connectivity.

10. The method of claim 8, further comprising tracking and storing at least one of the control signals or a number of times shadow flicker occurs at the wind farm.

11. A system for managing shadow flicker at a wind farm having a plurality of wind turbines, the system comprising:
    a plurality of turbine-level controllers, each of the plurality of wind turbines being controlled by one of the plurality of turbine-level controllers; and,
    a farm-level controller communicatively coupled to the plurality of turbine-level controllers, the farm-level controller configured perform one or more operations, the one or more operations comprising:
    receiving a sun position of the wind farm;
    receiving a spatial location of one or more of the plurality of wind turbines with respect to at least one receptor;
    receiving a yaw angle from each of the plurality of wind turbines;
    comparing each of the yaw angles to a predetermined angle range;
    if one or more of the yaw angles is within the predetermined angle range, determining whether shadow flicker is occurring at the at least one receptor based, at least in part, on the sun position and the spatial location of the one or more of the plurality of wind turbines; and,
    sending a control signal to one or more of the plurality of turbine-level controllers instructing one or more of the plurality of turbine-level controllers to implement a corrective action to reduce the shadow flicker.

12. The system of claim 11, wherein the sun position comprises at least one of an azimuth angle of the sun or an altitude of the sun.

13. The system of claim 11, wherein the spatial location of the one or more of the plurality of wind turbines with respect to at least one receptor further comprises at least one of a height of a tower of one of the plurality of wind turbines, a rotor diameter of one or more of the plurality of wind turbines, or a distance between one or more of the plurality of wind turbines and the at least one receptor.

14. The system of claim 13, wherein determining whether shadow flicker is occurring at the wind farm based, at least in part, on the sun position and the spatial location of the one or more of the plurality of wind turbines further comprises:
    determining whether the distance between one or more of the plurality of wind turbines and the at least one receptor is within a shadow range of the at least one receptor based on at least one of time of day or time of year; and, determining whether shadows are in a direction of the at least one receptor based on the spatial location of one or more of the plurality of wind turbines.

15. The system of claim 11, further comprising at least one sensor for measuring a light intensity in at least one location at the wind farm, the farm-level controller configured to receive the light intensity and determine whether shadow flicker is occurring at the wind farm based, at least in part, on the sun position, the spatial location of one or more of the plurality of wind turbines, and the light intensity.

16. The system of claim 11, wherein the one or more operations further comprise:
   receiving information regarding weather forecast data; and,
   determining whether shadow flicker is occurring at the wind farm based, at least in part, on the sun position, the spatial location of one or more of the plurality of wind turbines, and the weather forecast data, the weather forecast data comprising at least one of temperature, cloud coverage, air density, air pressure, precipitation, wind conditions, or humidity.

\* \* \* \* \*